United States Patent
Sitton

(10) Patent No.: US 7,159,357 B2
(45) Date of Patent: Jan. 9, 2007

(54) COMPOSITE FISH HOOK HAVING IMPROVED STRENGTH AND PENETRATION CAPABILITY

(76) Inventor: Gary L. Sitton, P.O. Box 3543, Beaumont, TX (US) 77704

( * ) Notice: Subject to any disclaimer, the term of this patent is extended or adjusted under 35 U.S.C. 154(b) by 0 days.

(21) Appl. No.: 11/168,045

(22) Filed: Jun. 28, 2005

(65) Prior Publication Data

US 2005/0235551 A1    Oct. 27, 2005

Related U.S. Application Data

(62) Division of application No. 08/989,574, filed on Dec. 12, 1997, now Pat. No. 6,910,297.

(51) Int. Cl.
*A01K 83/00*    (2006.01)

(52) U.S. Cl. .................................... 43/43.16

(58) Field of Classification Search .............. 43/42.33, 43/43.16
See application file for complete search history.

(56) References Cited

U.S. PATENT DOCUMENTS

| | | | |
|---|---|---|---|
| 356,499 A | 4/1887 | Pennell | |
| 827,757 A | 8/1906 | Shakespeare, Jr. | |
| 842,594 A | 1/1907 | Van Vleck | |
| 2,180,557 A | 11/1939 | Skoverski | 43/28 |
| 2,511,117 A | 6/1950 | Loeb | 43/42.37 |
| 2,526,240 A | 10/1950 | Labunde | 43/43.16 |
| 2,531,981 A | 11/1950 | Liebe | 43/43.16 |
| 2,539,735 A | 1/1951 | Forsyth | 43/43.16 |
| 2,598,011 A | 5/1952 | Pitre | 43/44.8 |
| 2,624,146 A | 1/1953 | Kahle | 43/43.16 |
| 2,865,131 A | 12/1958 | Ellis | 43/43.16 |
| 2,995,858 A | 8/1961 | Rathmann | 43/44.8 |
| 3,399,482 A | 9/1968 | Cox | 43/15 |
| 3,562,948 A | 2/1971 | Santo et al. | 43/43.4 |
| 3,724,116 A | 4/1973 | Lindner et al. | 43/42.24 |
| 3,755,954 A | 9/1973 | Lucius | 43/43.16 |
| 3,834,060 A | 9/1974 | Wagenknecht | 43/44.8 |
| 4,060,928 A | 12/1977 | Messler et al. | 43/43.16 |
| 4,126,957 A | 11/1978 | Randall | 43/43.16 |
| 4,165,578 A | 8/1979 | Klein | 43/44.8 |
| 4,334,381 A | 6/1982 | Carver et al. | 43/42.29 |
| D276,360 S * | 11/1984 | Sitton | D22/144 |
| D288,467 S | 2/1987 | Sitton | D22/30 |
| 4,833,816 A | 5/1989 | Sitton et al. | 43/43.16 |
| 5,024,020 A | 6/1991 | Sitton | 43/43.16 |
| 5,084,998 A | 2/1992 | Dixon | 43/43.16 |
| 5,165,197 A | 11/1992 | Sitton | 43/44.82 |

FOREIGN PATENT DOCUMENTS

| | | |
|---|---|---|
| GB | 214228 | 3/1924 |
| GB | 273585 | 7/1927 |
| GB | 973689 | 10/1964 |

(Continued)

OTHER PUBLICATIONS

Internet reference article: "AISI 1006 steel, cold drawn," Date unknown.

(Continued)

*Primary Examiner*—Francis T. Palo
(74) *Attorney, Agent, or Firm*—Mark R. Wisner

(57) ABSTRACT

A fish hook formed of plastic having metal or other material embedded into, or applied to, or formed on the point thereof to increase the ability of the hook to penetrate the mouth of a fish. The metal or other material either forms the point of the hook or is a friction-modifying agent which decreases the resistance to penetration of the hook.

5 Claims, 3 Drawing Sheets

| | FOREIGN PATENT DOCUMENTS | | | JP | 9121719 A | * 5/1997 |
|---|---|---|---|---|---|---|
| | | | | JP | 9289844 A | * 11/1997 |
| GB | 1153567 | 5/1969 | | | | |
| GB | 1204223 | 9/1970 | | | | |
| GB | 1239000 | 7/1971 | | | | |
| GB | 2067882 | 8/1981 | | | | |
| GB | 2137861 | 10/1984 | | | | |
| GB | 2158683 | 11/1985 | | | | |
| JP | 406269236 | 9/1994 | | | | |

OTHER PUBLICATIONS

Internet reference article: "Ausimont Hylar 460 PVDF Polyvinylidene Flouride," Date unknown.

* cited by examiner

COMPOSITE FISH HOOK HAVING IMPROVED STRENGTH AND PENETRATION CAPABILITY

This application is a divisional of application Ser. No. 08/989,574, filed Dec. 12, 1997, Gary L. Sitton, Inventor, for COMPOSITE FISH HOOK HAVING IMPROVED STRENGTH AND PENETRATION CAPABILITY, now U.S. Pat. No. 6,910,297. The present application is directed to a fishing hook having improved penetration capability which is comprised of two or more materials. In more detail, the present invention relates to a fish hook comprised of plastic and either a second plastic or another material which either reduces the friction which resists penetration or increases the sharpness of the hook.

BACKGROUND OF THE INVENTION

Plastic fishing hooks are described in the patent literature (see U.S. Pat. Nos. 4,833,816, 5,024,020, and 5,165,197) and available commercially from the Sitton Super Setter Company (Beaumont, Tex.). Such hooks are characterized by a number of significant advantages over conventional steel hooks. Their shock-absorbing action increases their penetrating power by maintaining the axis of penetration of the point substantially parallel to the line of action of the hook. Further, they do not rust, are inexpensive to manufacture, and, in many cases, release from a hooked snag before the line to which they are attached breaks. However, concerns as to their ability to penetrate the mouth of a fish have hampered their acceptance by both the commercial and sport fishing industry.

In actuality, the unique ability of the plastic hook described in U.S. Pat. No. 4,833,816 to maintain the axis of penetration substantially parallel to the direction in which the hook is pulled by the line to which the hook is attached provides "setting power," e.g., penetration ability, which is more than adequate for many species of commercially important sport and game fish. The ability of that hook to flex when hit by a fish and then effectively straighten out to drive the point through the fish's mouth enables that hook to be used as molded. In other words, no finishing operation is needed after molding to increase the sharpness of the point, an advantage which helps keep the cost of manufacture low and enables the use of relatively inexpensive plastics. The relatively "soft" plastics which are used for molding such hooks have the advantage of being capable of being easily sharpened after use to a point with a conventional fingernail file or emery board when it is felt that the hook is not sharp enough.

Nevertheless, in those instances in which the hook is being used repeatedly and in large numbers, for instance, by commercial "long line" fisherman, such that sharpening is impractical because of the frequency of sharpening and the number of hooks being utilized, or when the target fish is characterized by a particularly bony mouth, and also for those fish with "teeth," it would be advantageous for the hooks described in those prior patents to have better penetration capability. It is, therefore, an object of the present invention to provide a fish hook comprised of two or more materials having improved penetration capability. It is also an object of the present invention to provide a fish hook with improved penetration capability which can be manufactured from inexpensive materials and which does not require finishing and/or sharpening after manufacture.

Another object of the present invention is to provide a fish hook having improved strength. Another object of the present invention is to provide a fish hook having a cavity formed therein for receiving a fish attractant such as a light, noisemaker or source of smell. Other objects, and the advantages which characterize the plastic fish hook of the present invention, will be made clear by the following description of several embodiments thereof.

SUMMARY OF THE INVENTION

These objects are met by providing, in a first aspect, a fish hook having improved penetration capability comprising an eye, shank, bight, and point formed of plastic and having a member substantially surrounded by, or preferably set or molded into, the plastic and running longitudinally through a portion thereof. The longitudinal member is comprised of a material having a hardness greater than the hardness of the plastic therearound and the end of the longitudinal member extends through the plastic at the point of the hook.

In a second aspect, the fish hook of the present invention comprises an eye, shank, bight, and point formed of plastic, the point being formed of two or more faces tapering downwardly and away from the point and having shoulders therebetween with a sharpened blade partially embedded in the plastic at one or more of the shoulders and preferably extending through the plastic along a portion of the shoulder. The sharpened blade is comprised of a material having a hardness greater than the hardness of the plastic in which the blade is embedded.

In a third aspect, the fish hook of the present invention comprises an eye, shank, bight, and point formed of plastic, the point being formed of two or more faces tapered downwardly and away from the point and having a layer of penetration-increasing material applied to the faces thereof. In one embodiment, the material comprising the penetration-increasing layer is a friction-modifying agent which acts, after the point initially penetrates the mouth of a fish, to decrease the friction between the faces of the point and the edges of the penetration in the mouth of the fish caused by the point. In a second embodiment, the material comprising the penetration-increasing layer is a layer of a material having a hardness greater than the hardness of the plastic to which the layer is applied.

DESCRIPTION OF PREFERRED EMBODIMENTS

Figure 1:
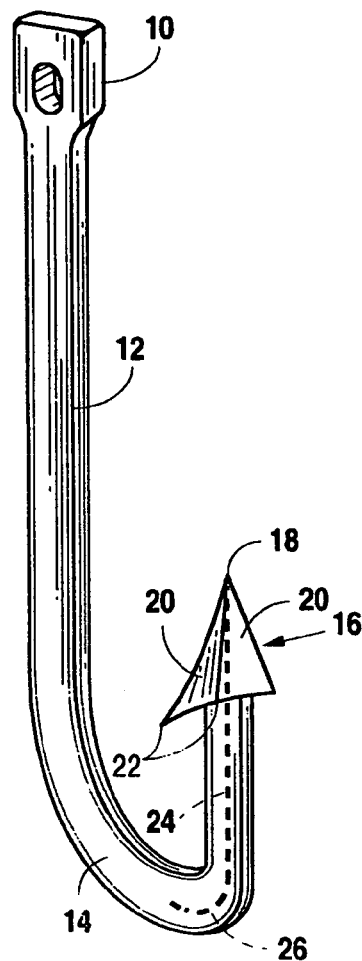
FIG. 1 is an elevational view of a presently preferred embodiment of the composite fish hook of the present invention.

Referring to FIG. 1, there is shown a first embodiment of the fish hook of the present invention, which is comprised of an eye 10, shank 12, bight 14, and point 18, all molded of plastic to form a monolithic fish hook. Although those skilled in the art will recognize that it is not a necessary component of the fish hook of the present invention, in the embodiment shown in FIG. 1, a barb 16 is formed at point 18 and two or more faces 20 taper downwardly and away from the point 18 in a generally pyramidal shape. The bottom corners 22 of barb 16 act to retain the fish on the hook after the barb has penetrated the mouth of the fish as known in the art. A longitudinal member, shown in shadow line at reference numeral 24, is substantially surrounded by, or contained within, the plastic comprising the hook and runs longitudinally through a portion of the length of the hook, extending out of the plastic forming the point 18 at one end.

Longitudinal member 24 is comprised of a material which is harder than the surrounding plastic. In a presently preferred embodiment, longitudinal member 24 is comprised of metal in the form of a short piece of metal wire which is placed in the mold (not shown) and around which the plastic hook is molded. However, those skilled in the art who have the benefit of this disclosure will recognize that the longitudinal member 24 can also be comprised of many other materials which are harder than the plastic comprising the hook, including glass, ceramic materials, and/or a type of plastic which is harder the plastic hook.

For example, in one preferred embodiment, the plastic comprising the hook is a thermoplastic resin which is injection molded such as nylon. One particularly preferred thermoplastic resin is sold under the brand name XYTEL (E.I. duPont de Nemours & Co., Wilmington, Del.). If a hook having strength and hardness properties greater than those of hooks molded from plastics such as nylon is desired, the hook may be molded from plastics such as rigid rod or liquid crystal polymers such as those which are available from Hoechst-Celanese (New York, N.Y.). These polymers may include fillers and various fibers such as glass, silica, and/or silicon hydride fibers.

Regardless of the material or materials comprising longitudinal member 24, the property which confers upon the fish hook of the present invention the particular advantage of increased penetrating capability is the longitudinal member 24 which forms point 18. Note that the member 24 need not be capable of being sharpened to form the point 18. In the embodiment shown in FIG. 1, the cross-sectional dimension of longitudinal member 24 is small enough that placing an elongate piece of suitable material (see below) having a length suitable for positioning in the mold in which the hook is molded and molding the hook around that piece leaves a sharp point. The use of longitudinal members of such small cross-sectional dimension is made possible by the support provided on all sides of the longitudinal member 24 by the surrounding plastic comprising the hook. In other words, member 24 need not necessarily be strong, just sharp at one end. The small dimension of longitudinal member 24 also has the advantage of not substantially affecting the flex characteristics of the plastic hook that are described in the above-cited U.S. Pat. No. 4,833,816, which patent is hereby incorporated into this specification in its entirety by this reference thereto.

Because the longitudinal member 24 need not be particularly strong, in one embodiment, the present invention is comprised of a ceramic or glass longitudinal member. The use of glass as this longitudinal member allows the forming of an extremely sharp point because the glass can be placed in the mold while heated and drawn longitudinally until the hot glass strand breaks. Such a strand is of such small diameter that the resulting point is very sharp. Other plastics, much harder than, for instance, nylon, may also be used to form points in this manner. Although not a concern if the hook is molded from an opaque plastic, the use, of glass as the longitudinal member 24 allows the entire hook to be transparent the plastic comprising the hook and the glass are clear.

In an embodiment which is not shown, the longitudinal member 24 is press-fit into a recess formed in the point of the hook after molding. In this alternative embodiment, if the point of the hook is deemed too dull, the user need only grasp the portion of the longitudinal member which protrudes from the point of the hook with a pair of pliers and pull a short portion of the longitudinal member out of the hook. The protruding portion is then broken off or cut, for instance, with a pair of diagonal pliers or cutters, to leave a sharp point.

If needed for certain uses, longitudinal member 24 is comprised of material such as steel wire which is rigid enough that its rigidity increases the strength of the hook. For instance, in FIG. 1, the longitudinal member 24 is shown extending down from the point 18 and around a portion of the bight 14 of the hook. That construction may also be utilized to provide enough surface contact between longitudinal member 24 and the plastic comprising the hook to provide sufficient friction to prevent the loss of the longitudinal member 24 from out of the point 18. When steel wire with a bend 26 which extends part way around the bight 14 of the hook is utilized as the longitudinal member 24 as shown in FIG. 1, the bend 26 in the wire acts as means extending at an angle from the axis of the longitudinal member for positively engaging the hook to affirmatively retain, or anchor, the wire therein.

Figure 2:
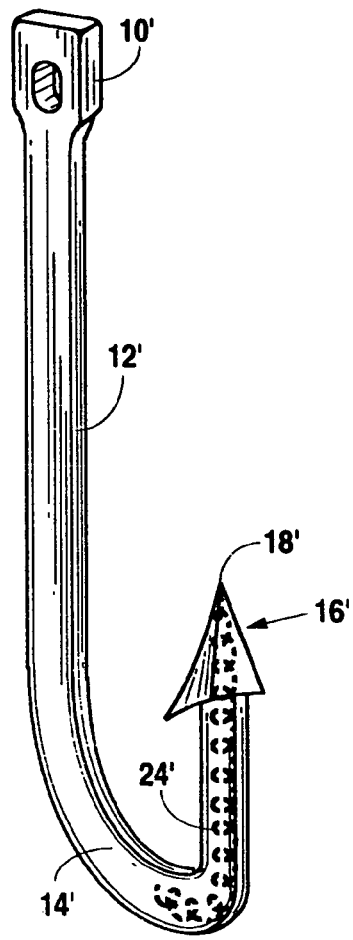
FIG. 2 is an elevational view of an alternative embodiment of the fish hook of FIG. 1.

Another embodiment of this means for anchoring the longitudinal member is illustrated in FIG. 2. In this alternative embodiment, the longitudinal member 24' is formed in the shape of a spiral, the loops of the spiral extending at an angle from the longitudinal axis of member 24', to affirmatively retain the member 24' in the point 18'. In a further alternative embodiment (not shown), the longitudinal member is shaped with a bulge or other structure at the end opposite the end forming the point to anchor the member in the hook. When such an anchoring means is utilized, the member need extend only a very short longitudinal distance back into the hook from the point. A†similar anchoring effect is achieved in the case of a longitudinal member comprised of plastic by formation of chemical cross-links between the polymer comprising the hook which can be considered, on a molecular level, to extend at an angle from the longitudinal axis. For instance, both plastics may be thermoset plastics which covalently cross-link when molded.

As noted above, a longitudinal member such as the member 24 shown in FIG. 1 may affect the flex characteristics of the hook in a manner which compromises the above-described desirable flex characteristics of the hook. If, however, it is desired to provide the hook of the present invention with a longitudinal member which both provides a sharp point and increases the strength of the hook, the longitudinal member may be comprised of fine diameter wire which is tightly coiled (e.g., more tightly coiled than shown in FIG. 2), the coils also functioning as the means extending at an angle from the longitudinal axis of the member for retaining the member in the barb.

Figure 3A:
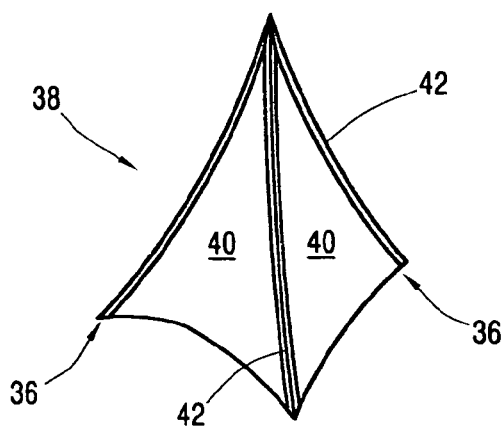
FIGS. 3A and 3B are elevational views, respectively, of the barb of a second preferred embodiment of the fish hook of the present invention.
Figure 3B:
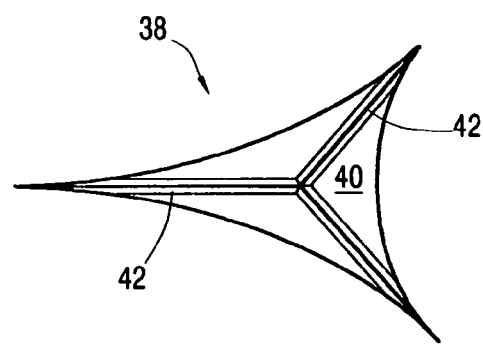

Referring now to FIGS. 3A and 3B, a third embodiment of the present invention is shown which is in many respects identical to the embodiments shown in FIGS. 1 and 2 such that only the point 38 is shown. The hook shown in FIGS. 3A and 3B differs from the hooks shown in FIGS. 1 and 2 in the manner in which the point 38 is formed and the manner in which the penetration ability of the hook is maximized. Specifically, molded into each of the shoulders between the faces 40 forming the point 38 are metal strips or blades 42 having the sharp edge of the blade extending along the shoulder so as to provide cutting edges which penetrate the fish's mouth. Again, the embodiment shown in FIGS. 3A and 3B includes a barb, indicated generally at reference numeral 36, but those skilled in the art will recognize that the hook need not include a barb. In a particular preferred embodiment, the blades 42 are fabricated from metal which is thin enough that the edge of the strip is itself capable of cutting, but the present invention also contemplates the use of a metal strip having a sharpened edge. As is the case with the longitudinal member 24 of FIG. 1, the blades 42 need not be strong because they are effectively trapped or confined by the surrounding plastic comprising barb 36, which provides the side-to-side support needed to resist rough or abusive treatment. Although shown in FIGS. 3A and 3B as being joined at the point 38, those skilled in the art who have the benefit of this disclosure will recognize that each of the metal strips 42 can be separate from the others.

Figures 4, 6:
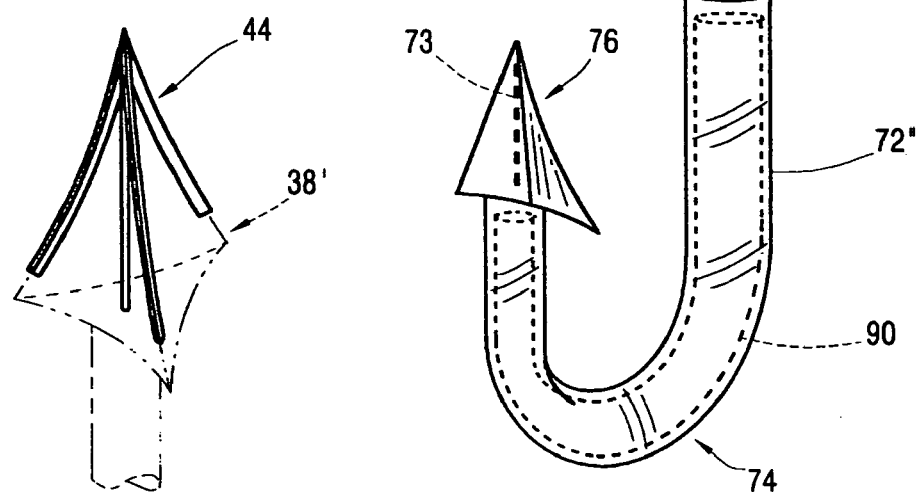
FIG. 4 is an elevational view of the barb and a portion of the bight of a fish hook constructed in accordance with the present invention and which represents a combination of the features of the hooks shown in FIGS. 1 and 3.
FIG. 6 is an elevational view of a second alternative embodiment of the fish hook of FIG. 1.

The embodiments shown in FIGS. 1 and 3 are adapted for use in a single embodiment as shown in FIG. 4, which is a perspective view of a metal "spider" as it appears on the point 38' (shown in shadow lines) of the hook. Spider 44 is formed of two or more metal strips (three being shown in FIG. 4 since the particular embodiment shown includes a barb 36') which comprise the blades 42 of the embodiment shown in FIG. 3 when molded into the plastic of point 38' and a metal longitudinal member 24' such as the longitudinal member 24 of the embodiment shown in FIG. 1, all joined into a single piece at a point which forms the point 38'.

Figure 5:
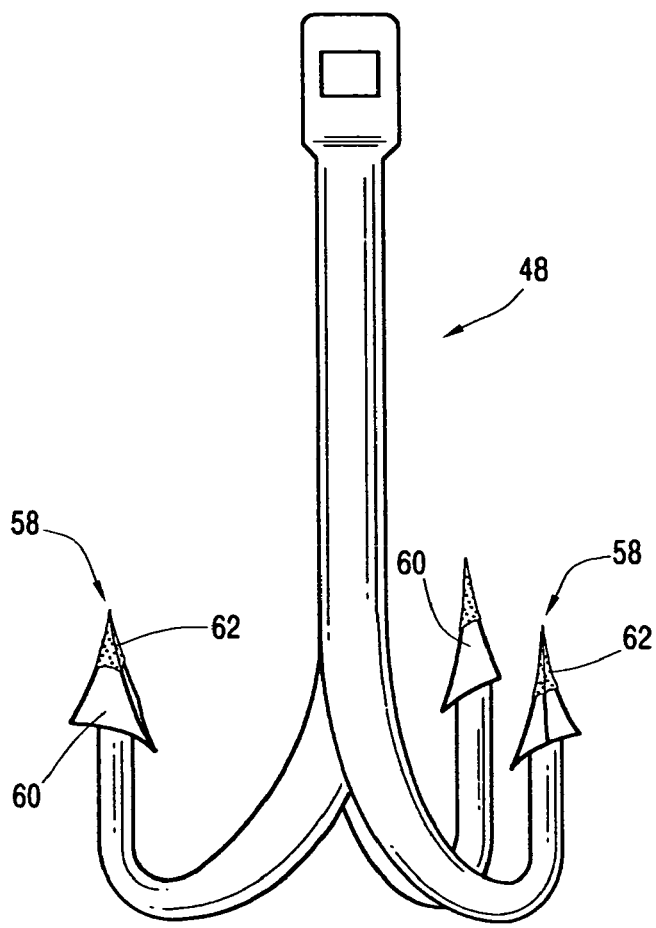
FIG. 5 is an elevational view of a third preferred embodiment of the fish hook of the present invention.

A fifth embodiment of the fish hook of the present invention is indicated generally at reference numeral 48 in FIG. 5. Although hook 48 is shown as a treble hook, the component parts are again similar to the embodiments shown in FIGS. 1 and 2, and it will be recognized from this disclosure by those skilled in the art that any of the several embodiments shown and/or disclosed may be constructed as a treble hook. Further, treble hooks constructed in accordance with the teachings of the present invention may also include one or both of the flex characteristics and/or the connection part disclosed in U.S. Pat. No. 5,165,197, hereby incorporated into this specification in its entirety by this specific reference.

In the embodiment shown in FIG. 5, the portion of the hook adjacent the point 58 is coated, or capped, with a layer 62 of material which is either a friction-modifying agent or a material having a hardness greater than that of the plastic comprising the hook. By use of the phrase "friction-modifying agent," reference is being made to any material which acts, after initial penetration of the mouth of the fish by the point 58 of the hook, to decrease the friction between the faces 60 of point 58 and the edges of the flesh of the mouth of the fish at the point of penetration. Such materials include plastics with low coefficients of friction such as those available under the brand name DELRIN (E.I. duPont de Nemours Co. (Wilmington, Del.). Such materials are coinjection molded over a portion of the point 58, mold coated, or spray-on mold coated, all as known in the art, over a portion of point 58. Friction-modifying agents such as various fluorocarbon coatings (e.g., polytetrafluoroethylene (PTFE) such as is available under the brand name TEFLON (E.I. duPont de Nemours & Co., Wilmington, Del.)) are also applied to the hook 58 as taught in U.S. Pat. No. 5,084,998, hereby incorporated in its entirety by this specific reference thereto, in the post-molding, or finishing step.

Alternatively, the cap 62 is comprised of a material having a hardness greater than that of the plastic comprising the hook, and in a particularly preferred embodiment, that material is metal which is sputtered or vacuum metallized onto the hook proximate the point 58 using methods known in the plastic molding art. The cap 62 need not, however, necessarily be comprised of metal. There are a number of ceramics and plastics having a hardness greater than that of the plastics which are advantageously used in forming the hook and which are capable of being coinjection molded or mold coated onto the hook to provide a more durable surface over the portion of the faces 60 adjacent point 58 and which function to maintain the sharpness of point 58. Note also that some such materials, in addition to being harder than the plastic comprising the hook, may have a lower coefficient of friction than the plastic comprising the hook such that a cap 62 made from such materials functions both to maintain the sharpness of the point 58 and also to reduce the resistance to penetration of the point 58 into the mouth of the fish.

In FIG. 6, yet another embodiment of the fish hook of the present invention is shown which incorporates, in addition to certain of the features described in connection with FIGS. 1–4, certain additional structural elements. The hook in FIG. 6 is provided with the eye 70, shank 72, bight 74, and barb 76 of the embodiments shown in FIGS. 1–4, as well as a longitudinal member 73 similar to the longitudinal member 24 of FIG. 1, but the shank 72 is formed in separate sections 72' and 72", connected by a joint formed by the loops 84 integral with both sections. The joint in shank 72 allows the bight 74 and barb 76 to have "action" in the water, i.e., limited movement relative to the line (not shown) attached to the hook through eye 70, for better presenting the bait on the hook to the fish. The portion 72" of shank 72 may be comprised of plastic conferring upon that portion 72" the flex characteristics described in U.S. Pat. No. 4,833,816 or a harder, stronger plastic such as the rigid rod and/or liquid crystal polymers described above.

To further increase the attractiveness of the bait impaled on the hook to a fish, the section 72' is provided with a longitudinal cavity 86 having a fish attractant received therein. In the embodiment shown in FIG. 6, the fish attractant takes the form of a plurality of metal or plastic balls 88 confined therein which are capable of movement in cavity 86 to rattle or otherwise attract attention. Likewise, the section 72" is molded around a reflective or fluorescent-colored core 90. Those skilled in the art will recognize from this disclosure that, as discussed above, the longitudinal member 24' can be made of glass and therefore be integral with the core 90 to provide a mirrored reflective combination core and point. It will also be apparent to such persons that the various features shown in FIG. 6 may be utilized to advantage in connection with any or all of the embodiments shown in FIGS. 1–5.

Figure 7:
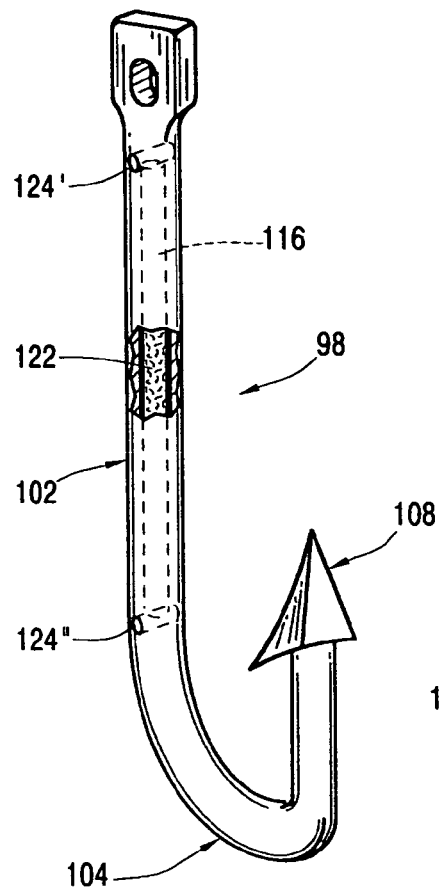
FIG. 7 is an elevational view of an alternate embodiment of the fish hook of FIG. 6.

In the embodiment shown in FIG. 7, the hook 98 is provided with a cavity 116 formed in the shank 102 for receiving a fish attractant in the form of a wick 122 comprised of an absorbent material for impregnating with a liquid chemical attractant such as the many liquid attractants currently available commercially. Shank 102 is provided with one or more openings 124 into the cavity 116 for passage of water in and out of the cavity 116 for gradually washing the liquid attractant out of the absorbent material comprising wick 122 while the hook 98 is in the water. The supply of liquid attractant absorbed into the wick 122 is then replenished by immersing or soaking the hook 98 in that liquid. In the preferred embodiment shown in FIG. 7, the shank 102 is provided with one or more openings 124' at the top of the cavity 116, e.g., at the end of the cavity 116 nearest the eye 100 of hook 98, and a second set of one or more openings 124" spaced downwardly along the shank 102 toward the bight 104 (or even near the point 108) so that, as the hook 98 is retrieved, water will pass into the opening(s) 124', through the cavity 116 to wash a portion of the attractant out of the wick 122, and out of the opening(s) 124".

Although described as a "wick" 122, it will be recognized by those skilled in the art who have the benefit of this disclosure that wick 122 may be comprised of any material which is capable of acting as a carrier for a chemical attractant. In one embodiment, the wick 122 is comprises of a wax or absorbent plastic capable of attracting and binding the liquid attractant. In another embodiment, the wick 122 is comprised of cellulose, alginate or other naturally occurring fibers or amorphous materials capable of acting as a sponge for absorbing liquid attractant or a synthetic such as a polyvinyl alcohol or polyacrylic acid. In another embodiment, made possible because of the inexpensive nature of the hook of the present invention, the wick 122 is comprised of a material such as shellac and the attractant is impregnated into the wick 122 so that the entire wick 122 slowly dissolves in water to release the attractant. The hook is then discarded (or preferably recycled) when the wick has completely dissolved.

Figure 8:
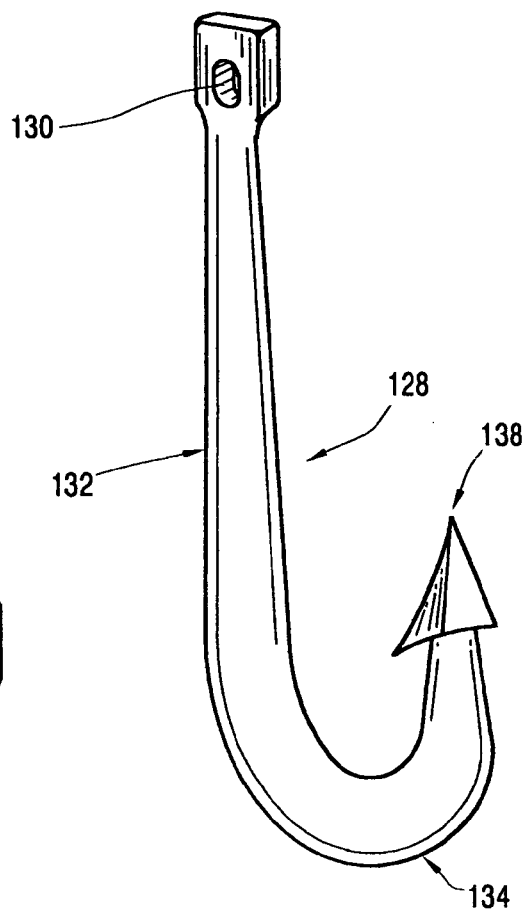
FIG. 8 is an elevational view of a fourth preferred embodiment of the fish hook of the present invention.

Referring now to FIG. 8, a presently preferred embodiment of a plastic hook constructed in accordance with the present invention and having increased strength characteristics is indicated generally at reference numeral 128. Hook 128 is, as in the other embodiments described herein, comprised of an eye 130, shank 132, bight 134, and point 138. It will be noted, however, that the portion of the shank 132 of hook 128 which comprises the bight 132 is larger in cross-sectional dimension than the portion of the shank 132 which is between the bight 134 and point 138 or near the eye 130. In other words, the shank 132 of hook 128 is tapered from a smaller dimension near the eye 130 to a wider diameter in the portion of the shank 132 comprising the bight 132 and then back to a narrow diameter before reaching the point 138. Tapering the shank 132 of hook 128 in this manner, which so far as in known is not feasible with conventional metal fish hooks, enables the use of a shank of smaller cross-sectional dimension while achieving the greater strength that is available from the larger dimensioned portion of shank 132 at bight 134.

In those instances in which even greater strength is desired, the composite fish hook of the present invention is molded in a cross-sectional shape which contributes additional strength to the hook. For instance, instead of being molded in a substantially circular cross-sectional shape, the hook of the present invention is molded in oval or elliptical cross-sectional shape with the larger dimension of the shape being oriented so as to increase the resistance of the hook from straightening at the bight 134 when pulling pressure is exerted on point 138. Alternatively, a rib (not shown) is molded on the outside of bight 134 (e.g., along the larger radius curve of bight 134) to increase the resistance of bight 134 to straightening and/or the hook is molded in a shape which provides such resistance. So far as is known, it is not possible to shape metal fish hooks in this manner.

When plastics such as the rigid rod and liquid crystal polymers described above are utilized in a hook such as the hook 128 having a tapered shank 132, the resulting hook is characterized by strength properties which are similar to those of the conventional metal fish hook but which still retain the advantages of the plastic hook, e.g., rust resistance, transparency (or a milky color), and desirable flex characteristics. The relative change in the diameter of the shank 132 of the hook 128 from the ends near the eye 130 and point 138 to the bight 134 depends on the strength desired and is determined by trial and error or by mathematical calculation based on known formulas relating diameter to the strength properties of the particular plastic and/or composite material being utilized.

Figure 9:
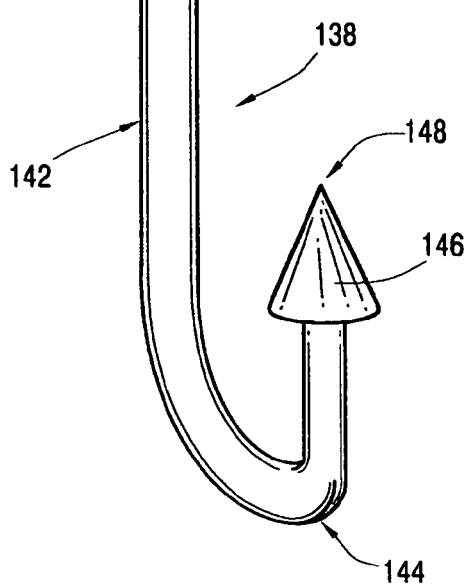
FIG. 9 is an elevational view of an alternate embodiment of the fish hook of FIG. 1.

Referring now to FIG. 9, another embodiment of the hook of the present invention is indicated generally at reference numeral 138. Hook 138 is similar to the hooks shown in FIGS. 1–7 in that it is comprised on an eye 140, shank 142, bight 144, and point 148 and may include any or all of the variations shown in those figures, e.g., a cavity such as the cavity 86 or 116 for receiving a fish attractant, a longitudinal member such as is shown at reference numerals 18 or 24', a cap comprised of a layer such as the layer 62 of friction-modifying agent or a material having a hardness greater than that of the plastic comprising the hook 138, or any of the other features described herein.

The hook 138 is, however, provided with a barb which, rather than being pyramidally-shaped in the manner of the barb of the hooks shown in FIGS. 1–8, is conically-shaped. The conically-shaped barb 146 has the advantage of holding a fish more securely once hooked than barbs having the more-or-less pyramidal shape of the barbs of the hooks shown in FIGS. 1–8. This improvement results from elimination of the cutting and/or tearing action of the corners 22 (referring to FIG. 1) of conventional, pyramidally-shaped barbs as the bottom surface 23 of barb 16 bears against the back side of the flesh that is penetrated by the point of the barb. Referring again to FIG. 9, once the point 148 of the barb 146 penetrates the flesh, penetration continues until the barb passes all the way through the opening created by the point. The fish is then retained on the hook 138 (or any hook) by the bearing of the underside of the barb (e.g., the surfaces 23 of the hook shown in FIG. 1) against the back side of the opening through which the barb has passed. The corners 22 (referring again to FIG. 1) of the barb 16, however, cause further tearing and cutting of the flesh in the area of that opening, creating increased opportunity for the barb 16 to pass back out of the same opening, such that the fish can "throw the hook". The barb 146 of hook 138 lacks the corners 22 of the barb 16 shown in FIG. 1, however, and is therefore less likely to tear or cut the flesh. Further, the round underside 148 of the barb provides a greater surface area to bear against the backside of the flesh, thereby distributing the forces over more of the flesh and further reducing the likelihood of tearing.

It will further be apparent to those skilled in the art who have the benefit of this disclosure that certain changes may be made to the component parts thereof without changing the manner in which those parts function to achieve their intended result. For instance, just as the "spider" 44 shown in FIG. 4 is fabricated and the plastic hook then molded in such a way as to effectively make the hook and spider a single integral piece, so also can the longitudinal member comprising that spider be fabricated as part of the cap 62 shown in FIG. 5 so as to provide means for anchoring the cap to the barb 56 of that hook. Similarly, any of the hooks shown in FIGS. 1–4 and 6–9 are advantageously molded as a treble hook as shown in FIG. 5 and any of those hooks can be molded with or without the features for presenting and/or attracting that are shown in FIGS. 6 and 7. All such changes are intended to fall within the scope of the present invention as it is defined in the following claims.

What is claimed is:

1. A fish hook having improved penetration capability comprising an integral eye, shank, bight, and point formed of plastic, said point having two or more faces tapering downwardly and away from said point with shoulders therebetween, and a strip member embedded in the plastic forming said hook along one or more of the shoulders, said strip member extending through the plastic along a portion of the shoulder and being comprised of a material having a hardness greater than that of the plastic comprising said hook.

2. The fish hook of claim 1 wherein said strip member is comprised of metal.

3. The fish hook of claim 1 comprising at least two of said strip members.

4. The fish hook of claim 3 additionally comprising a metal wire running longitudinally through at least a portion of the plastic comprising said hook, the end of said metal wire being formed integrally with the point at which said strip members meet to form the point of said hook.

5. The fish hook of claim 4 additionally comprising means extending at an angle from the axis of said metal wire for anchoring said wire, having said strip members joined thereto, into the plastic comprising said hook.

* * * * *